3,060,158
STOPPING AGENTS FOR EMULSION POLYMERIZATION PROCESSES
Harry Albert, Lafayette Hill, Pa., assignor to Pennsalt Chemicals Corporation, Philadelphia, Pa., a corporation of Pennsylvania
No Drawing. Filed Dec. 16, 1959, Ser. No. 859,850
13 Claims. (Cl. 260—83.7)

This invention relates to an improved process for shortstopping polymerization processes, particularly those polymerization processes for making synthetic rubber latices.

Synthetic rubber latices are prepared commercially by emulsion polymerization of rubber-forming monomers (e.g., butadiene and styrene) and the polymerization is stopped to give a product of desired optimum characteristics. Much study has been made toward finding good shortstops and certain di-lower-alkyldithiocarbamates have been found quite useful. In particular, the sodium salt of dimethyldithiocarbamate has been used commercially in synthetic rubber polymerization processes. Although this agent enjoys much use, it has at least one serious disadvantage. This is that during use in the polymerization system the sodium dimethyldithiocarbamate becomes oxidized to tetramethylthiuram disulfide, a very active and well-known vulcanization accelerator. As a result, this rubber accelerator remains in the finished rubber and causes undesirable and uncontrollable variation in its vulcanization rate.

It has now been found that this disadvantage of an N,N-dialkyldithiocarbamate shortstop can be overcome by stopping the emulsion polymerization of synthetic rubber with an alkali metal salt of a mono-alkyldithiocarbamate taken from the group consisting of alkali metal mono-n-butyldithiocarbamate and alkali metal mono-amyldithiocarbamates.

It is quite unexpected that the mono-n-butyl- and mono-amyldithiocarbamates are effective since other mono-alkyldithiocarbamates are of little or no use as shortstops. Furthermore, the mono-n-butyl- and mono-amyldithiocarbamates are surprisingly stable in aqueous solution and can be shipped or stored in solution whereas their homologues show much instability. The oxidation products of the mono-n-butyl- and mono-amyldithiocarbamates which might be formed during use are di-alkylthiuram disulfides (not tetraalkyl) and have little accelerator activity and thus cannot significantly affect the cure rate of the polymer.

In carrying out the process of this invention, the conventional polymerization recipes may be used and the shortstop added in the usual manner. For example, hot synthetic rubber recipes (persulfate initiated) or cold synthetic rubber recipes (hydroperoxide initiated) may be used. The polymerizable material for preparing synthetic rubber latices may be, as is well known, any one or more butadienes or their admixture with a monoolefin copolymerizable with butadiene. Thus, the butadienes will include butadiene-1,3, isoprene, chloroprene, cyanobutadiene-1,3,2-phenylbutadiene, piperylene, 2,3-dimethylbutadiene-1,3 and the like. The copolymerizable monomer, which will normally comprise up to about 70% of the mixture will be a monoolefin containing a single $CH_2=C<$ group having at least one of the free valence bonds attached to an electronegative group. Such olefins include aryl olefins such as styrene, vinyl naphthylene, α-methylstyrene, p-chlorostyrene, etc.; the α-methylene carboxylic acids and their esters, amides and nitriles such as acrylic acid, methylacrylic acid, acrylonitrile, methacrylamide, and the like. Thus, the synthetic rubber may be any butadiene polymer synthetic rubber latex.

The addition of the shortstop agent will be made after the desired degree of polymerization has occurred. The amount added will be that required to retard or stop the polymerization as desired and the amount is not critical. Usually the amount of agent used will be between about 0.025 and about 2.0 parts per hundred parts of monomer (phm.) with about 0.10 to about 0.2 phm. being preferred. As little as 0.01 phm. will show the effect, but for practical purposes at least about 0.15 phm. will be used. Using more than 2 phm. is not necessary and wasteful of material.

The n-butyl-dithiocarbamate is a well-known compound readily prepared by reacting n-butylamine with carbon disulfide and then slowly adding an alkali metal hydroxide. The mono-amyldithiocarbamate is prepared similarly, the amylamine used being obtained from the commercially available monoamylamine which consists of a mixture of the primary isomers which contain a $-CH_2-NH_2$ group (i.e., a primary amine group and a primary carbon atom attached to the amino nitrogen atom). This isomer mixture consists predominantly of n-amylamine (about 55% to 65% by weight) and has lesser amounts of 2-methyl-1-butylamine (about 25% to 35%) and 3-methyl-n-butylamine (about 5% to 15%). The alkali metal dithiocarbamates prepared from all of these primary amylamine isomers are operable as the shortstops of this invention.

The following examples will further illustrate the invention. All parts given are parts by weight.

EXAMPLE I

A polymerization recipe was prepared as follows:

| | Parts |
|---|---|
| Water | 111 |
| NaOH | 0.18 |
| Soap flakes | 2.50 |
| t-Dodecyl mercaptan | 0.18 |
| α,α'-Azodi-iso-butyronitrile | 0.05 |
| Styrene | 15.3 |
| Butadiene-1,3 | 46.0 |

The above recipe was polymerized at 50° C. and conversion to polymer determined periodically. The was done by evaporating a weighed sample of the latex, first under an infrared lamp for 10 minutes, then in an oven at 70° C. for one hour, and then determining the amount of polymer residue. After about 60% conversion was obtained (about 36 hours) one part of shortstop per 100 parts of rubber obtained was added as a 2% aqueous solution. The following Table I indicates the results obtained with various agents:

*Table I*

| Agent | Time of Polymerization (Hours) | Percent Conversion | Polymerization Rate (Percent/ 1 hr.) |
|---|---|---|---|
| Sodium N-n-butyldithiocarbamate (1 phr.) [2] | 18.0 | 23.1 | |
| | 35.5 | 58.3 | |
| | [1] 36.0 | 59.3 | 2.01 |
| | 38.0 | 59.5 | 0.10 |
| | 42.0 | 60.8 | 0.32 |
| | 61.0 | 68.2 | 0.39 |
| Sodium N-amyldithiocarbamate (1 phr.) | 18.0 | 24.6 | |
| | 35.5 | 60.1 | |
| | [1] 36.0 | 60.6 | 2.03 |
| | 39.0 | 60.9 | 0.10 |
| | 42.0 | 61.1 | 0.06 |
| | 61.0 | 65.7 | 0.24 |
| Sodium N-methyldithiocarbamate (1 phr.) | 18.0 | 19.1 | |
| | 35.5 | 53.0 | |
| | [1] 36.5 | 54.9 | 1.93 |
| | 40.0 | 59.0 | 1.28 |
| | 42.0 | 61.6 | 1.30 |
| Sodium N-ethyldithiocarbamate (1 phr.) | 18.0 | 21.9 | |
| | 35.5 | 58.8 | |
| | [1] 36.0 | 59.9 | 2.11 |
| | 38.0 | 62.2 | 1.15 |
| | 42.0 | 66.8 | 1.15 |
| Sodium N-n-propyldithiocarbamate (1 phr.) | 18.0 | 20.8 | |
| | 35.5 | 58.8 | |
| | [1] 36.0 | 59.9 | 2.17 |
| | 39.0 | 63.0 | 1.03 |
| | 42.0 | 66.0 | 1.00 |

[1] Point at which stopping agent added.
[2] Phr.=parts per 100 parts of rubber.

EXAMPLE II

Following the procedure of Example I, the following recipe was polymerized:

| | Parts |
|---|---|
| Water | 95.1 |
| Soap flakes | 2.64 |
| Potassium persulfate | 0.158 |
| n-Dodecylmercaptan | 0.264 |
| Styrene | 13.21 |
| Butadiene-1,3 | 39.6 |

Table II illustrates the effect of sodium N-n-butyldithiocarbamate as a shortstop at two concentrations:

*Table II*

| Agent | Time of Polymerization (Hours) | Percent Conversion | Polymerization Rate (%/1 hr.) |
|---|---|---|---|
| Sodium N-n-butyl dithiocarbamate (1 phr.) | 18 | 51 | |
| | 22 | 64.6 | 3.33 |
| | [1] 24 | 71.2 | |
| | 43 | 66.8 | 0.00 |
| Sodium N-n-butyl dithiocarbamate (0.01 phr.) | 18 | 49.3 | |
| | 22 | 62.1 | 3.20 |
| | [1] 24 | 68.5 | |
| | 43 | 81.9 | 0.71 |

[1] Point at which stopping agent added.

EXAMPLE III

A polymerization recipe for cold rubber was prepared as follows:

| | Parts by weight |
|---|---|
| Butadiene | 72 |
| Styrene | 28 |
| Water | 200 |
| t-Dodecyl mercaptan | 0.20 |
| Dresinate 214 [1] | 4.5 |
| Daxad-11 [2] | 0.10 |
| Versene Fe$_3$ Specific [3] | 0.02 |
| p-Menthane hydroperoxide | 0.04 |
| $FeSO_4 \cdot 7H_2O$ | 0.12 |
| $K_4P_2O_7$ | 0.15 |
| $Na_3PO_4 \cdot 12H_2O$ | 0.30 |

[1] Dresinate 214—potassium soap of rosin acids.
[2] Daxad-11—dispersing agent, sodium salt of polymerized alkyl naphthalene sulfonate.
[3] Versene Fe$_3$ Specific—sequestering agent, monosodium salt of N,N-di-hydroxyethylglycine.

Polymerization was carried out at 5° C. and the effect of various shortstops is shown in Table III:

*Table III*

MONO-ALKYLDITHIOCARBAMATES AS STOPPING AGENTS IN COLD RUBBER RECIPE

| Stopping Agent | Amount Added phm.[1] | Conversion | | | |
|---|---|---|---|---|---|
| | | Percent when stopped | After 1 hr. at 50° C. | After 18 hrs. at 50° C. | After 24 hrs. at 50° C. |
| None | | 66.3 | | 94.6 | 93.4 |
| $(CH_3)_2$—N—CSSNa | 0.15 | 66.3 | 65.0 | 6.1 | 65.8 |
| n—$C_4H_9$NHCSSNa | 0.15 | 66.3 | 66.3 | 67.2 | 67.5 |
| n—$C_4H_9$NHCSSNa | 0.05 | 66.3 | 66.0 | 67.0 | 67.0 |
| n—$C_4H_9$NHCSSNa | 0.01 | 67.3 | 69.3 | 73.5 | 73.8 |
| $C_5H_{11}$NHCSSNa | 0.15 | 66.3 | 66.0 | 67.2 | 66.8 |
| $C_5H_{11}$NHCSSNa | 0.05 | 66.3 | 64.2 | 65.1 | 65.0 |
| $C_5H_{11}$NHCSSNa | 0.01 | 66.3 | 69.8 | 78.0 | 78.1 |

[1] Phm.=Parts per 100 parts of monomers.

EXAMPLE IV

Aqueous solutions containing 30% of various mono-alkyldithiocarbamates were prepared and left to stand. Visual and other observations were made after several months and are indicated in Table IV:

*Table IV*

| Substituent of Mono-alkyldithiocarbamate | Observation |
|---|---|
| N-Methyl | Has slight precipitate; amine odor. Precipitate is identified as N,N'-dimethylthiourea. |
| N-Ethyl | Has precipitate; amine odor. |
| N-Propyl | Slight odor; crystalline precipitate identified as N,N'-di-n-propylthiourea. |
| N-n-Butyl | No visual change; slight sweet odor. Chemical analysis showed no change. |
| N-Amyl | Very slightly turbid; slight sweet odor. Chemical analysis showed no change. |
| N-Isobutyl | Voluminous precipitate identified as n,n'-diisobutylthiourea. |
| N-Allyl | Moderate precipitate; amine odor. |

It is evident from the above data that the use of mono-n-butyl and mono-amyldithiocarbamates are effective, stable shortstops for hot and cold polymerization recipes and fully equivalent to the accepted dimethylthiocarbamate shortstop. Furthermore, when mono-n-butyl- or mono-amyldithiocarbamate is used as a shortstop and the rubber thus made is molded and vulcanized, the vulcanization rate shows no significant variation. This is a great advantage to fabricators of rubber goods and represents a distinct advance in the art.

Since many variations of this invention will be obvious to those skilled in the art, the above description is not to be construed as limiting this invention.

I claim:
1. In the process of polymerizing a butadiene polymer synthetic rubber latex the improvement which consists of stopping the polymerization with an alkali metal salt of a mono-alkyldithiocarbamate wherein said mono-alkyldithiocarbamate is a member selected from the group of mono-n-butyl- and mono-amyldithiocarbamates.
2. The improved process of claim 1 in which the alkali metal salt of the mono-alkyldithiocarbamate is sodium n-butyldithiocarbamate.
3. The improved process of claim 1 in which the alkali metal mono-alkyldithiocarbamate is sodium mono-amyldithiocarbamate.
4. In the process of polymerizing a hot butadiene-styrene copolymer synthetic rubber latex recipe, the improvement which consists of stopping the polymerization with an alkali metal salt of a mono-alkyldithiocarbamate wherein the alkyl radical of said mono-alkyldithiocarbamate is a member selected from the group of n-butyl and amyl radicals.
5. The improved process of claim 4 in which the mono-alkyldithiocarbamate is an alkali metal mono-n-butyldithiocarbamate.

6. The improved process of claim 4 in which the mono-alkyldithiocarbamate is an alkali metal mono-amyldithiocarbamate.

7. In the process of polymerizing a cold butadiene-styrene copolymer synthetic rubber latex recipe, the improvement which consists of stopping the polymerization with an alkali metal salt of a mono-alkyldithiocarbamate wherein the alkyl radical of said dithiocarbamate is a member selected from the group of n-butyl and amyl radicals.

8. The improved process of claim 7 in which the mono-alkyldithiocarbamate is an alkali metal mono-n-butyldithiocarbamate.

9. The improved process of claim 7 in which the mono-alkyldithiocarbamate is an alkali metal mono-amyldithiocarbamate.

10. The improved process of claim 4 wherein the stopping agent is sodium mono-n-butyldithiocarbamate.

11. The improved process of claim 4 wherein the stopping agent is sodium mono-amyldithiocarbamate.

12. The improved process of claim 7 in which the stopping agent is sodium mono-n-butyldithiocarbamate.

13. The improved process of claim 7 in which the stopping agent is sodium mono-amyldithiocarbamate.

References Cited in the file of this patent

UNITED STATES PATENTS

| | | |
|---|---|---|
| 2,602,078 | Schulze et al. | July 1, 1952 |
| 2,662,876 | Antflinger | Dec. 15, 1953 |

OTHER REFERENCES

Schildknecht: Polymer Processes, pages 152 and 169, Interscience Publishers, Inc., New York, 1956.

UNITED STATES PATENT OFFICE
CERTIFICATE OF CORRECTION

Patent No. 3,060,158                                        October 23, 1962

Harry Albert

It is hereby certified that error appears in the above numbered patent requiring correction and that the said Letters Patent should read as corrected below.

Column 3, EXAMPLE II, Table II, after

| | | | |
|---|---|---|---|
| Sodium N-n-butyl dithiocarbamate (1 phr.) ---------------- | ⎧ 18<br>⎨ 22<br>⎨ 24<br>⎩ 43 | 51<br>64.6<br>71.2<br>66.8 | -----<br>3.33<br>-----<br>0.00 | insert the following:

> Note: The crumb obtained by salt-acid coagulating the latex was white in color and was established to be essentially the same as standard hot styrene-butadiene rubber.

column 4, EXAMPLE III, Table III, under the heading "Percent when stopped", fifth line thereof, for "67.3" read -- 66.3 --; same table, under the heading "After 18 hrs. at 50° C.", line 2 thereof, for "6.1" read -- 66.1 --.

Signed and sealed this 2nd day of April 1963.

(SEAL)
Attest: